Feb. 27, 1923.
W. R. R. HISCUTT
1,446,702
OPERATING MECHANISM FOR BRAKES
Filed Oct. 11, 1921
2 sheets-sheet 1
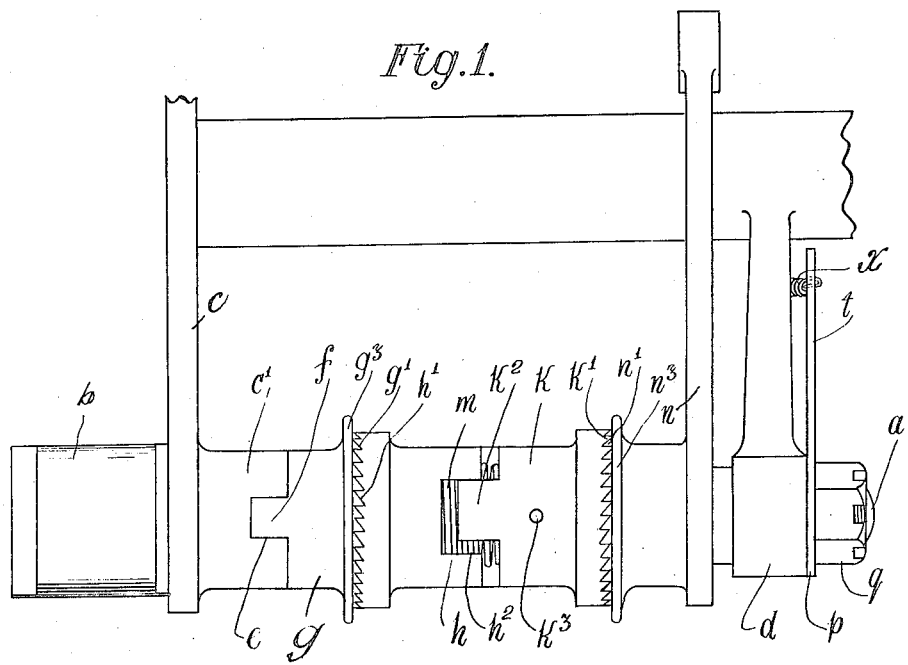
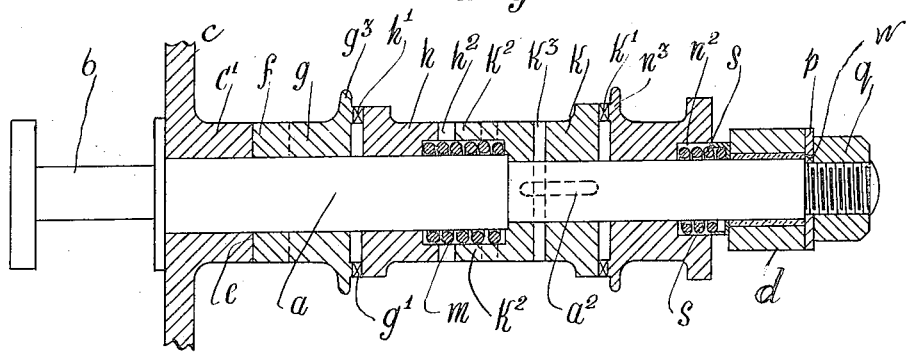
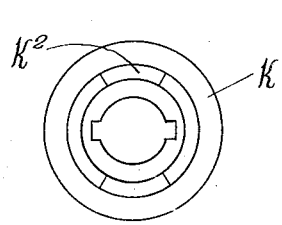
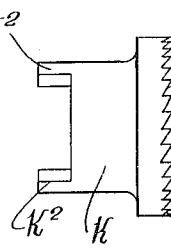
INVENTOR.
WILLIAM ROBERT RYDE HISCUTT.
PER.
ATTORNEYS.

Patented Feb. 27, 1923.

1,446,702

UNITED STATES PATENT OFFICE.

WILLIAM ROBERT RYDE HISCUTT, OF LONDON, ENGLAND.

OPERATING MECHANISM FOR BRAKES.

Application filed October 11, 1921. Serial No. 507,112.

*To all whom it may concern:*

Be it known that I, WILLIAM ROBERT RYDE HISCUTT, subject of the King of Great Britain and Ireland, and resident of 27 Harley Mews North, Harley Street, London, in the county of London, England, have invented certain new and useful Improvements in Operating Mechanism for Brakes, of which the following is a specification.

My invention relates to improvements in operating mechanism for brakes and like and has for its object to provide a simple and effective mechanism which will automatically adjust itself so as to take up wear or slack when this exceeds a certain degree, in such a manner that the brake actuating lever or the like will always be maintained in substantially the correct position for applying the actuating force to the brake or the like in the most efficient manner.

According to the general principle of the invention, I arrange the operating lever for the brake or the like upon the shaft carrying the actuating cam toggle or other mechanism, and hereinafter called the brake actuating shaft, so as to be capable of rotating thereon. Between the operating lever and a fixed abutment upon the brake casing or other part is provided two sets of oppositely inclined ratchet teeth, the separate inner members which carry the inner teeth of the two sets of ratchets being inter-connected by a tongue and slot of such a size as to allow relative movement between them to an extent sufficient to allow clearance between brake shoes and brake drum when lever returns to "off" position after adjustment.

The oppositely inclined ratchet teeth co-operate to automatically adjust the position of the brake actuating shaft to take up wear or slack of the brake shoes or their equivalent. The brake actuating shaft also carries a rod or bar which is connected by a spring to a stationary portion of the vehicle for instance the back axle casing, in the case of a motor vehicle, and serves as an indicator as to the extent of wear of the brake shoes or the like.

In order that the invention may be readily understood reference is made to the accompanying drawings, in which I have shown the invention applied to the brake actuating shaft of a motor vehicle. In the drawings:—

Figure 1 is a plan view in elevation of the brake actuating shaft and mechanism for operating the same.

Figure 2 is a vertical longitudinal section through the brake actuating shaft.

Figure 3 is a side elevation and

Figure 4 is a front elevation of one of the sleeves mounted on the brake actuating shaft.

Figure 5:
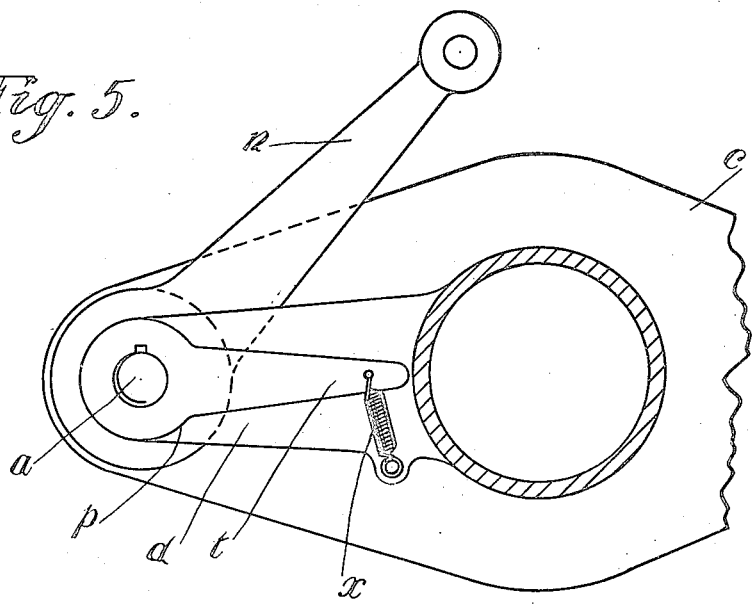
Fig. 5 is an end view of the apparatus.
Figure 6:
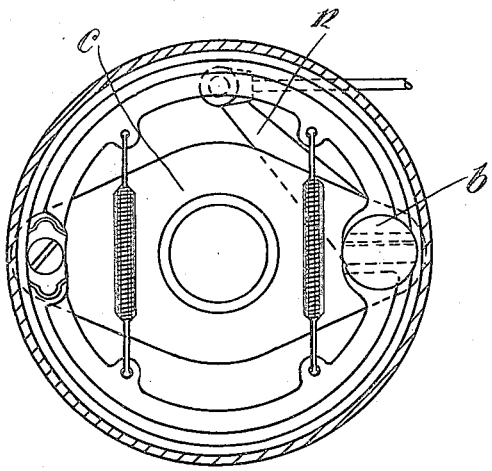
Fig. 6 is a sectional end view showing the toggles and cam.

The actuating shaft $a$ for the brake carries at one end a cam $b$ or toggle or the like mechanism for operating the brake shoes, blocks or their equivalent as will be readily understood. The shaft $a$ extends through a bearing $c^1$ formed integrally with the casing $c$ of the brake and at its opposite end is further supported in a bearing $d$ which may be carried by an arm or bracket fixed to the casing of the rear axle as shown diagrammatically in Figure 1. The bearing $c^1$ in the brake casing is provided on its outer face with a transverse slot or key-way $e$, in which engages a key or tongue $f$ carried at one end of a ring or sleeve $g$ mounted upon the brake actuating shaft $a$ so that the shaft can rotate therein. The sleeve $g$ is provided with ratchet teeth $g^1$ on its opposite face which cooperate with ratchet teeth $h^1$ on the adjacent face of a second sleeve or ring $h$ also mounted upon the shaft $a$ so that the shaft can rotate therein. The sleeve $h$ is formed at its opposite end with a transverse slot or the like $h^2$ into which engage tongue $k^2$ upon a member $k$ keyed upon the brake shaft $a$ and fixed by means of a taper pin or the like $k^3$ or by other suitable means. The tongues $k^2$ upon this latter member are of less width than the slots $h^2$ in the sleeve $h$ with which they engage, and the difference in width of the slot and tongue is such as to allow sufficient radial clearance between them to ensure the brake being out of action when the brake operating lever $n$ which is mounted on the shaft $a$ so that it can rotate therein is returned to normal position after adjustment.

The inner faces of the sleeve $h$ and the member $k$ are recessed to form an annular groove in which is located a coil spring $m$ serving to press the two members apart, thus retaining the ratchet teeth $h^1$ on the loose sleeve $h$ engaged with ratchet teeth $g^1$ upon the ring $g$ connected to the brake casing. The outer face of the member $k$ fixed to the actuating shaft is provided with ratchet teeth $k^1$ of an opposite hand which co-operate with similar ratchet teeth $n^1$ formed on the adjacent face of the brake actuating lever $n$ loosely threaded upon the shaft $a$. The actuating lever $n$ is normally pressed towards the member $k$ by a spring $s$ located in an annular recess $n^2$ and bearing against the inner face of the bearing $d$. The actuating shaft $a$ is secured against axial movement by a washer and nut $p$, $q$ respectively, the nut screwing on to the end of the shaft and being locked in position by a split pin or other means.

The washer $p$ is fixed to the shaft by a small dowel pin $w$ or other means and is preferably formed integrally with or is secured with any suitable manner to a lever or the like $t$ which is preferably connected by means of a coil spring $x$ to a fixed portion of the frame, or to the rear axle casing, said spring serving to help return the brake actuating shaft to its normal position, when the said shaft is not being operated by the lever $n$.

The operation of the mechanism is as follows:—

When the brake pedal or lever is operated to apply the brake, the operating lever $n$ upon the brake actuating shaft $a$ will be partially rotated, and through the engagement of the ratchet teeth $n^1$ upon its face, it will also rotate the member $k$ which is fixed to the shaft $a$ and will thus actuate the brake. If and when the amount of movement or the extent of rotation of the shaft $a$ necessary to actuate the brake, is greater than the difference between the width of the tongue $k^2$ and slots $h^2$ forming the connection between the fixed member $k$ and the loose sleeve $h$ it will cause the loose sleeve to be rotated to the extent of the excess movement of the shaft $a$.

It will thus be seen that the shaft $a$ will be rotated through a predetermined distance without imparting corresponding movement to the sleeve $h$. For instance if the difference in width of the slots $h^2$ and tongues $k^2$ represents 10 degrees, the pitch of the ratchet also being 10 degrees, and it is found to effectively actuate the brake it is necessary to rotate the shaft through 20 degrees, the engagement of the tongues $k^2$ with the slots $h^2$ will cause the sleeve $h$ to be rotated to the extent of 10 degrees. The sleeve during this movement is moved axially against the action of the spring $m$ and the ratchet teeth $h^1$ ride over the ratchet teeth $g^1$ on the stationary member $g$. On the brake operating lever $n$ being released, the member $k$ fixed to the shaft $a$ will rotate in the opposite direction independently of the sleeve $h$ through a distance representing 10 degrees and during a further distance of 10 degrees, the brake operating lever will be moved axially against the action of the spring $n$, the ratchet teeth $n^1$ sliding over the teeth $k^1$ it being understood that the brake operating lever $n$ is always returned to the predetermined position by a spring or the like connecting brake lever $n$ with a fixed portion of the frame or back axle casing. By this means it will be seen that the actuating shaft $a$ will always be automatically set to the correct position for the proper actuation of the brake for a given predetermined pressure or movement of the brake pedal lever, thus permitting braking to be effected at all times independently of wear of the brake shoes or the brake drum. It will be understood that the difference in width of the slots $h^2$ and the tongue $k^2$ is such as to leave sufficient clearance to ensure the brake being out of action when the operating lever or pedal is returned to its normal position.

The lever $t$ which is fixed to the brake actuating shaft is preferably located so that it projects therefrom at right angles to a plane passing through the actuating cam $b$ at the opposite end. By this means it is possible to ascertain at any time whether the brake shoes or their equivalent require renewing or whether the extent of wear of the lining of the brake drum requires attention. For instance if the plane passing through the cam $b$ is normally horizontal when the brake is "off," the lever $t$ will be substantially vertical and if, after a period of time owing to the brake shoes or the brake drum becoming worn, it is found that this lever is inclined, say at 45 degrees, it will be at once obvious that the cam $b$ is also inclined at the same angle to the horizontal, when the brake is "off" so that it will be at once seen that the brake linings or shoes will soon require attention.

In some cases it may not be desirable to permit axial movement of the brake operating lever. In this case the construction may be slightly modified by dispensing with the spring $s$ in the recess in the operating lever $n$ and instead of fixing the member $k$ to the actuating shaft, it may be slidably keyed thereto. Figures 3 and 4 show the construction of the member $k$ when two keys are adopted but it will be readily understood that castellations, squares, hexagons or the like may be used, one of said keys being shown in dotted lines at $a^2$ in Figure 2. In this case the action is substantially the same, with the exception that the member $k$ is slidden axially against the action of the spring $m$ when the teeth $n^1$ of the ratchet of operating lever $n$ slide freely past the ratchet teeth of the member $k$.

The operating lever $n$ and the ring or sleeve $g$ keyed to the brake casing may be provided with annular projecting rims $n^3$ and $g^3$ respectively serving to receive the ends of a flexible leather or other protective casing (not shown) which may be secured over these rims and may serve to retain grease or other lubricant and also exclude dust and water and thus ensure correct operating of the mechanism.

I claim:

1. Operating mechanism for brakes, comprising an operating shaft, an operating member loosely mounted on said shaft, teeth on said operating member, a driving clutch mounted in driving relation with said shaft and having teeth to co-operate with the teeth on the operating member, projections on said driving clutch, a loose clutch mounted on said shaft and having recesses co-operating with the projections on the driving clutch, and means for preventing said loose clutch from rotating backwardly on said shaft.

2. Operating mechanism for brakes, comprising an operating shaft, an operating member loosely mounted on said shaft, teeth on said operating member, a driving clutch mounted in driving relation with said shaft and having teeth to co-operate with the teeth on the operating member, projections on said driving clutch, a loose clutch mounted on said shaft and having recesses co-operating with the projections on the driving clutch, a clearance between said projections and recesses sufficient to permit of a reasonable clearance between the brake shoe and drum, and means for preventing said loose clutch from rotating backwardly on said shaft 3. Operating mechanism for brakes, comprising an operating shaft, an operating member loosely mounted on said shaft, teeth on said operating member, a driving clutch mounted in driving relation with said shaft and having teeth to co-operate with the teeth on the operating member, projections on said driving clutch, a loose clutch mounted on said shaft, for rotation in one direction only, said loose clutch having recesses co-operating with the projections on the driving clutch, and means for preventing said loose clutch from rotating backwardly on said shaft.

4. Operating mechanism for brakes, comprising an operating shaft, an operating member loosely mounted on said shaft, teeth on said operating member, a driving clutch mounted in driving relation with said shaft, and having teeth to co-operate with the teeth on the operating member, projections on said driving clutch, a loose clutch mounted on said shaft, for rotation in one direction only, said loose clutch having recesses co-operating with the projections on the driving clutch, a clearance between said projections and recesses sufficient to permit of a reasonable clearance between the brake shoe and drum, and means for preventing said loose clutch from rotating backwardly on said shaft.

5. Operating mechanism for brakes, comprising an operating shaft, an operating member loosely mounted on said shaft, teeth on said operating member, a driving clutch mounted in driving relation with said shaft and having teeth to co-operate with the teeth on the operating member, projections on said driving clutch, a loose clutch mounted on said shaft and having recesses co-operating with the projections on the driving clutch, means for preventing said loose clutch from rotating backwardly on said shaft, and a lever associated with said shaft for indicating the wear on the brake shoe.

6. Operating mechanism for brakes, comprising an operating shaft, an operating member loosely mounted on said shaft, ratchet teeth on said operating member, a driving clutch mounted in driving relation with said shaft and having oppositely disposed ratchet teeth to co-operate with the teeth on the operating member, projections on said driving clutch, a loose clutch mounted on said shaft and having recesses co-operating with the projections on the driving clutch, ratchet teeth for preventing said loose clutch from rotating backwardly on said shaft, and springs tending to keep said teeth in engagement.

7. Operating mechanism for brakes, comprising an operating shaft, an operating member loosely mounted on said shaft, ratchet teeth on said operating member, a driving clutch mounted in driving relation with said shaft and having oppositely disposed ratchet teeth to co-operate with the teeth on the operating member, projections on said driving clutch, a loose clutch mounted on said shaft, recesses in said loose clutch co-operating with the projections on the driving clutch, a clearance between said projections and recesses sufficient to permit of a reasonable clearance between the brake shoe and drum, ratchet teeth for preventing said loose clutch from rotating backwardly on said shaft, and springs tending to keep said teeth in engagement.

8. Operating mechanism for brakes comprising an operating shaft, an operating member loosely mounted on said shaft, ratchet teeth on said operating member, a driving clutch mounted in driving relation with said shaft and having oppositely disposed ratchet teeth to cooperate with the teeth on the operating member, projections on said driving clutch, a loose clutch mounted on said shaft for rotation in one direction only, said loose clutch having recesses co-operating with the projections on the driving clutch, a clearance between said projections and recesses sufficient to permit of a reasonable clearance between the brake shoe and drum, ratchet teeth for preventing said loose clutch from rotating backwardly on said shaft, springs tending to keep said teeth in engagement and a lever associated with said shaft for indicating the wear on the brake shoe.

WILLIAM ROBERT RYDE HISCUTT.